United States Patent
Lee

(10) Patent No.: US 6,892,680 B2
(45) Date of Patent: May 17, 2005

(54) WATER INJECTION DEVICE FOR AN ENGINE

(75) Inventor: Hae-Wook Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 26 days.

(21) Appl. No.: 10/308,976

(22) Filed: Dec. 3, 2002

(65) Prior Publication Data

US 2003/0140873 A1 Jul. 31, 2003

(30) Foreign Application Priority Data

Jan. 29, 2002 (KR) ................................. 10-2002-0005066

(51) Int. Cl.⁷ ............................................. F02B 47/00
(52) U.S. Cl. ........................................................ 123/25 A
(58) Field of Search ............................ 123/25 A, 25 R, 123/25 C

(56) References Cited

U.S. PATENT DOCUMENTS

| | | | |
|---|---|---|---|
| 4,160,733 A | * | 7/1979 | Nelson .......................... 210/85 |
| 4,417,547 A | * | 11/1983 | Goodman et al. ........... 123/25 J |
| 4,800,848 A | * | 1/1989 | Hubbard .................... 123/25 E |
| 5,125,377 A | | 6/1992 | Mezheritsky |
| 5,718,194 A | | 2/1998 | Binion |
| 5,809,973 A | | 9/1998 | Iida et al. |
| 5,937,799 A | | 8/1999 | Binion |
| 5,992,353 A | | 11/1999 | Posselt |
| 6,112,705 A | * | 9/2000 | Nakayama et al. ....... 123/25 C |
| 6,237,547 B1 | | 5/2001 | Ishiyama |
| 6,311,651 B1 | | 11/2001 | Singh |

FOREIGN PATENT DOCUMENTS

EP            420647 A1   *   4/1991   ........... F02B/47/02

OTHER PUBLICATIONS

US 2001/0050074 A1, Dec. 13, 2001, Kawakami et al., "Fuel Injection Control Device".
US 2002/0023623 A1, Feb. 28, 2002, Okumura et al., "Apparatus for Detecting Fuel Property for Internal Combustion Engine".

* cited by examiner

Primary Examiner—Mahmoud Gimie
Assistant Examiner—Hyder Ali
(74) Attorney, Agent, or Firm—Morgan Lewis & Bockius LLP

(57) ABSTRACT

A water injection device for injecting water into the combustion chambers of an engine is disclosed. Water particles are injected through a system other than the fuel injection nozzle, and the water is injected through a suction system, but as to the injection of the water particles, the injection rate and injection time are optimally controlled in accordance with the internal situations of the combustion chambers.

7 Claims, 3 Drawing Sheets

(PRIOR ART)

WATER INJECTION DEVICE FOR AN ENGINE

FIELD OF THE INVENTION

The present invention relates to a water injection device for injecting water into a combustion chamber of an engine. More particularly, the present invention relates to a water injection device for decreasing engine smoke.

BACKGROUND OF THE INVENTION

Various devices have been proposed for reducing engine smoke by injecting water into a combustion chamber of an engine to control intra-chamber temperature. Such water injection devices typically have a single nozzle type injection device, which injects both fuel and water. The structure of these single nozzle type injection devices is highly complicated. In addition, since water and fuel are injected simultaneously, corrosion often occurs. Further, water is also injected at a high pressure together with the fuel, and therefore, the fuel system is overloaded, shortening the life expectancy of the engine. Still further, the roles of water and fuel are different within the combustion chamber. Thus, there is a technically restricting problem in that the time when fuel is injected and the time when water is injected have to correspond with each other.

Another device for introducing water into the combustion chamber is a suction tube (as compared with the direct water injection through the nozzle). This method has an advantage in that a sudden variation in temperature in the combustion chamber can be prevented. However, such a water injection device has its own limitations, such as the injection time and injection amount of the water particles.

SUMMARY OF THE INVENTION

The present invention provides a water injection device for injecting water into an engine. Water is injected through a system other than the fuel injection nozzle, namely a suction system, where the injection of the water is optimally controlled in accordance with the internal operating conditions within the combustion chamber. It should be appreciated that although the injection of water is described throughout this application, any other suitable coolant fluid may be used.

In accordance with an embodiment of the present invention, a water injection device for an engine includes a water injector having an injection port within a suction tube of the engine. A water supplying mechanism supplies water to the water injector, and an air supplying mechanism supplies air to the water injector. A valve mechanism for mixing together the water from the water supplying mechanism and the air from the air supplying mechanism supplies this mixture to the water injector. A control mechanism controls the valve mechanism in accordance with the operation situations of the engine.

Furthermore, there is also provided a method for injecting water into an engine. A water injector configured to inject fluids into an engine is provided. A compressor then compresses air from the engine's air filter and stores the compressed air in a compressed air tank. Water is also stored in a water tank. The compressed air tank and water tanks are fluidly coupled to a valve mechanism, such as one or more solenoid valves. The valve mechanism is in turn coupled to the water injector. The compressed air and water are then supplied to a valve mechanism. The operating conditions are measured within the engine, and a control mechanism controls the valve mechanism based on the measured operating conditions within the engine. The control mechanism either allows or restricts flow of a mixture of compressed air and water to the water injector. When operating conditions dictate, the mixture is injected into the engine. ng conditions within the engine.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
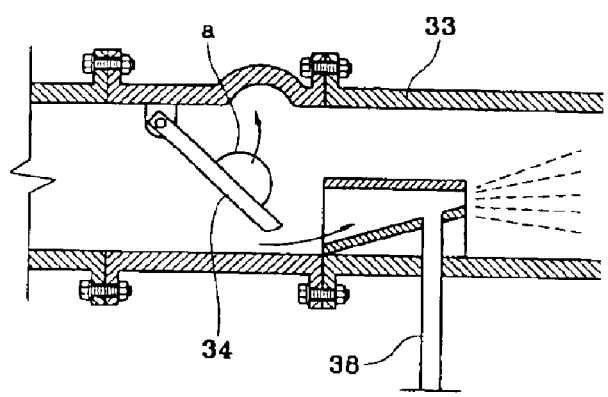
FIG. 1 illustrates a suction tube water injection device.

FIG. 1 shows a water injection device in which water is introduced into the combustion chamber through a suction tube. Air guiding plate 34, which is positioned in a suction tube 33, is opened proportionally to the suction force of the engine, so that air and water can be supplied automatically during the intake stroke of the engine, proportionally to the opening degree of the air guiding plate 34. When the suction force becomes strong enough to overcome the mass of weight "a" of the air guiding plate 34, water, which is supplied through a water supply tube 38, is atomized into the combustion chamber.

However, the introduction of the water particles is adjusted only by the fixed physical quantities such as the air guiding plate 34 and the weight "a". Therefore, this device is insufficient for meeting the dynamically varying situations of the combustion chamber by adjusting only the above fixed physical quantities.

Figure 2:
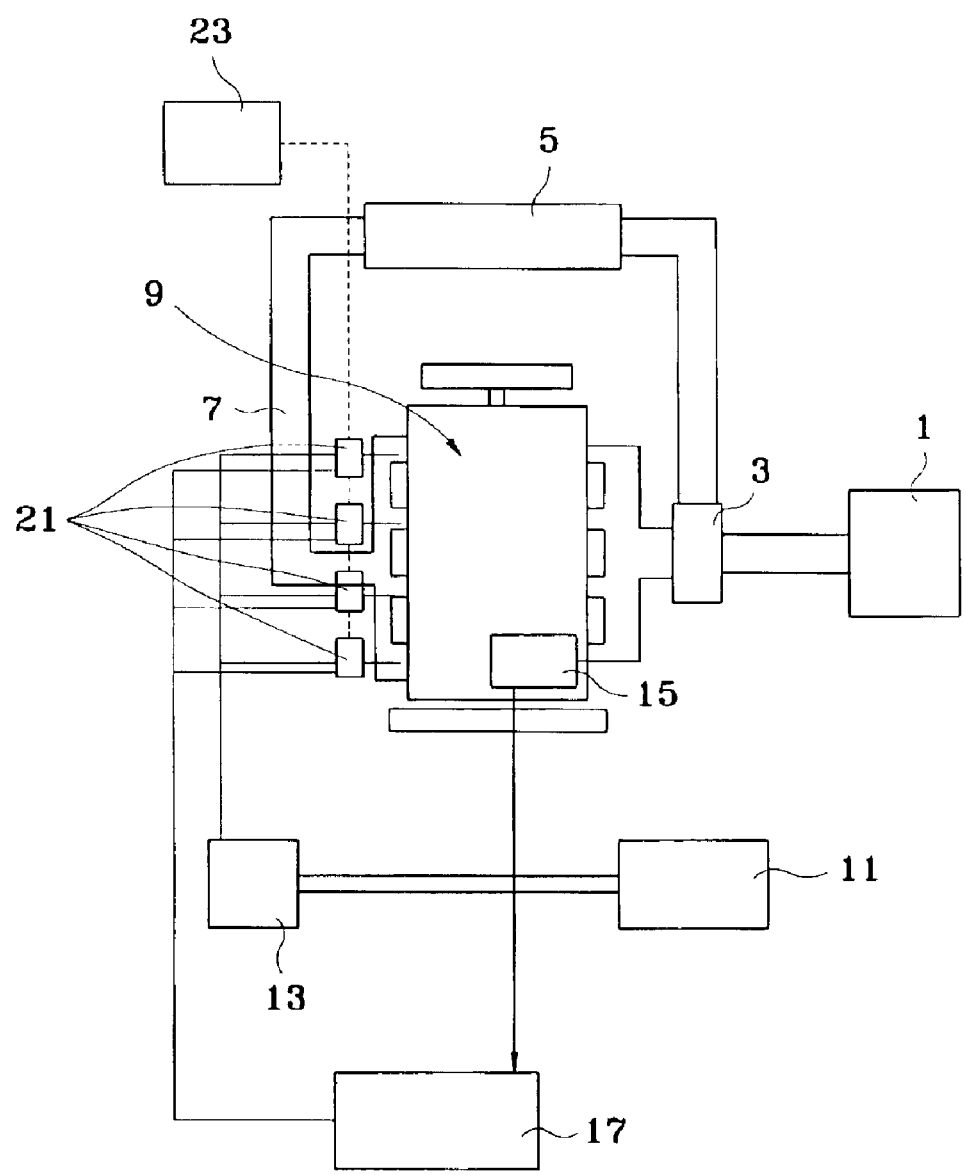
FIG. 2 illustrates a water injection device for an engine, according to the present invention.

As shown in FIG. 2, the water injection device according to the present invention is coupled to an engine 9. Air that enters an air filter 1 is compressed by a turbocharger 3 which is operated using exhaust gas. Compressed air from the turbocharger 3 is cooled by an intercooler 5, and is then supplied through a suction tube 7 into the combustion chamber. The suction tube is typically used to draw air into the combustion chamber via an intake valve. The water injection device also includes a water supply mechanism and an air supply mechanism.

Figure 3:
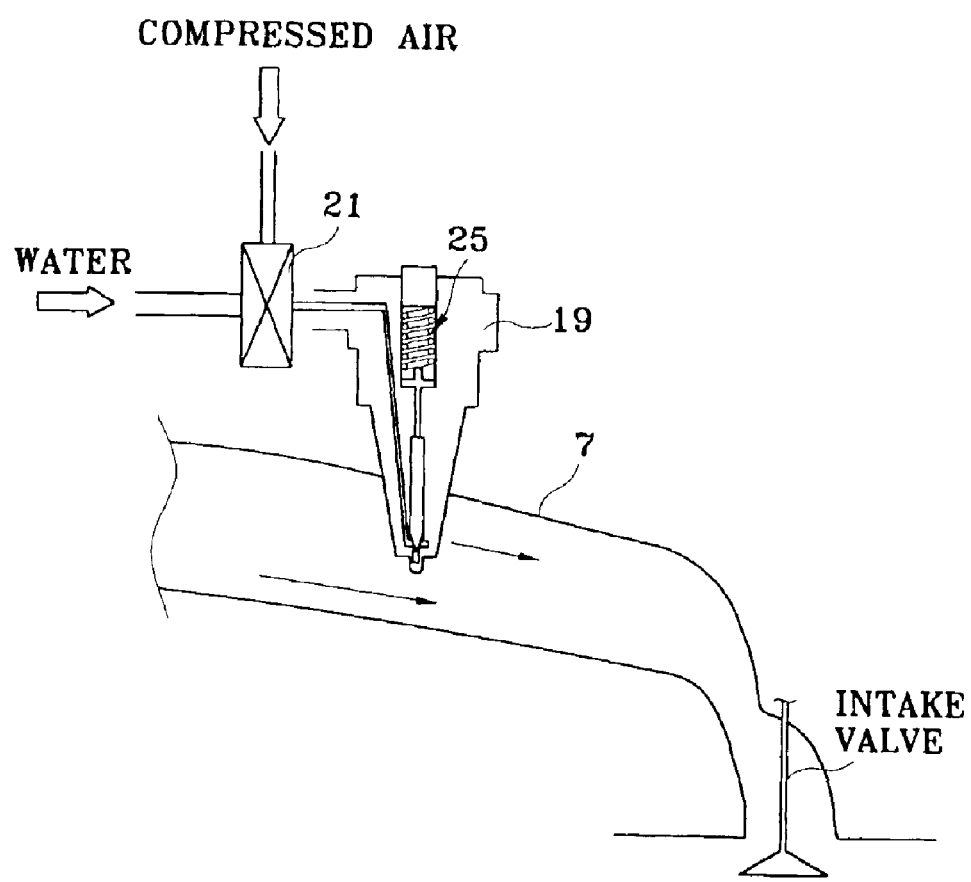
FIG. 3 illustrates a portion of the water injection device of FIG. 2.

The water supply mechanism includes a water tank 11 for storing water and a water pump 13 for pumping the water from the water tank 11 to a valve mechanism. The water pump 13 can be driven by the engine, as is well known, or by a separate motor. The air supply mechanism includes a compressor 15, preferably driven by the engine, and a compressed air tank 17 for storing compressed air from the compressor 15. The compressed air of the compressed air tank 17 can also be used for actuating the automatic door of a bus, or for driving the cargo compartment of a truck. The valve mechanism includes a plurality of solenoid valves 21 that are preferably electronically controlled to simultaneously supply the water from the water supply mechanism and the air from the air supply mechanism to the water injector 19 (FIG. 3). The control mechanism includes an electronic control unit 23 for controlling the solenoid valves 21 based on operation conditions within the engine.

As shown in FIG. 3, a check valve 25 is installed within the water injector 19 for forming a one-way path from the valve mechanism to the suction tube 7 of the engine. This prevents any reverse flow from the engine. In use, air enters the engine via the air filter 1 (FIG. 2), which removes and filters foreign materials. The air is then compressed by the turbocharger 3 (FIG. 2), cooled by the intercooler 5 (FIG. 2), and then ultimately introduced into the combustion chamber of the engine. The electronic control unit 23 (FIG. 2) detects if the intra-chamber temperature should be lowered, and controls the solenoid valves 21 (FIGS. 2 and 3) (valve mechanism) to supply a mixture of water and air into the combustion chamber to adjust the internal conditions of the combustion chamber. The compressed air produced by the compressor 15 (FIG. 2) based on the engine power is stored in the compressed air tank 17 (FIG. 2). Subsequently, the compressed air is sent to the solenoid valves 21 (FIG. 3), while the water of the water tank 11 (FIG. 2) is pumped by the water pump 13 (FIG. 2) towards the solenoid valves 21.

The solenoid valves 21 are continuously ready to inject the mixture of the water and the compressed air. When required, if the solenoid valves 21 are opened by control signals from the electronic control unit 23, water together with compressed air are sent through the check valves 25 and through the suction tube 7 of the engine into the combustion chambers. Thus, the water particles are sent through the suction tube 7 into the combustion chamber(s), and therefore, any steep temperature drop within the combustion chamber(s) can be prevented. Further, the water is injected through a system other than the fuel injection system, and therefore, the solenoid valves 21 are subjected to separate control in accordance with the internal conditions of the combustion chamber(s). Consequently, the water injection rate and the water injection time can be precisely controlled.

Furthermore, since the water is supplied through a separate system, conventional high pressure injection is not required, and the corrosion of the fuel injection nozzle and the like of the fuel supply system is prevented. This improves the life expectancy of the engine.

According to the present invention as described above, the water particles are injected through a system other than that of the fuel injection system, and therefore, a high durability of the components of the fuel system is ensured. Further, the water particles are injected through a suction system in such a manner that the water injection rate and the water injection time can be optimally controlled.

What is claimed is:

1. A water injection device for an engine, comprising:
   a water injector configured to be positioned within a suction tube of an engine;
   a water supply mechanism coupled to the water injector and configured to supply water to the water injector;
   an air supply mechanism also coupled to the water injector and configured to supply air to the water injector;
   a valve mechanism coupled between the water injector and the supply mechanisms where the valve mechanism is configured to selectively supply water from the water supply mechanism and the air from the air supply mechanism to the water injector; a control mechanism coupled to the valve mechanism and configured to control the valve mechanism based on operating conditions within the engine; and
   a check valve installed within the water injector, for forming a one-way path from the valve mechanism to the suction tube of the engine.

2. The water injection device of claim 1, wherein the water supply mechanism comprises a water tank for storing water and a water pump for pumping the water from the water tank to the valve mechanism.

3. A water injection device for an engine, comprising:
   a water injector having an injection port within a suction tube of an engine;
   a water supply mechanism for supplying water to the water injector;
   an air supply mechanism for supplying air to the water injector with a compressor driven by power from the engine and a compressed air tank for storing compressed air from the compressor;
   a valve mechanism for mixing together the water from the water supply mechanism and the air from the air supply mechanism to the water injector;
   a control mechanism for controlling the valve mechanism in accordance with operating conditions of the engine; and
   a check valve installed within the water injector, for forming a one-way path from the valve mechanism to the suction tube of the engine.

4. A water injection device for an engine, comprising:
   a water injector having an injection port within a suction tube of an engine;
   a water supply mechanism for supplying water to the water injector;
   an air supply mechanism for supplying air to the water injector;
   a valve mechanism including a plurality of solenoid valves electronically controlled to mix and simultaneously supply water from the water supply mechanism and the air from the air supply mechanism to the water injector;
   a control mechanism for controlling the valve mechanism in accordance with operating conditions of the engine; and
   a check valve installed within the water injector, for forming a one-way path from the valve mechanism to the suction tube of the engine.

5. A water injection device for an engine, comprising:
   a water injector having an injection port within a suction tube of an engine;
   a water supply mechanism for supplying water to the water injector;
   an air supply mechanism for supplying air to the water injector;
   a valve mechanism for mixing together the water from the water supply mechanism and the air from the air supply mechanism into a mixture and to supply this mixture to the water injector, wherein the water injector includes a check valve installed therein for forming a one-way path from the valve mechanism to the suction tube of the engine; and
   a control mechanism for controlling the valve mechanism in accordance with operating conditions of the engine.

6. A water injection device for an engine, comprising:
   a water injector having an injection port within a suction tube of an engine;
   a water supply mechanism for supplying water to the water injector;
   an air supply mechanism for supplying air to the water injector;
   a valve mechanism including a plurality of solenoid valves electronically controlled to mix and simultaneously supply water from the water supply mechanism and the air from the air supply mechanism to the water injector; and
   a control mechanism for controlling the valve mechanism in accordance with operating conditions of the engine.

7. The water injection device as claimed in claim 6, further comprising a check valve installed within the water injector, for forming a one-way path from the valve mechanism to the suction tube of the engine.

* * * * *